(12) United States Patent
Sarkar et al.

(10) Patent No.: US 6,698,201 B1
(45) Date of Patent: Mar. 2, 2004

(54) CASCADED BIMORPH ROTARY ACTUATOR

(75) Inventors: Niladri Sarkar, Brossard (CA); Aaron Geisberger, Plano, TX (US)

(73) Assignee: Zyvex Corporation, Richardson, TX (US)

( * ) Notice: Subject to any disclaimer, the term of this patent is extended or adjusted under 35 U.S.C. 154(b) by 0 days.

(21) Appl. No.: 10/163,331

(22) Filed: Jun. 5, 2002

Related U.S. Application Data
(60) Provisional application No. 60/312,706, filed on Aug. 16, 2001.

(51) Int. Cl.[7] ........................... F01B 29/10; H02K 15/00
(52) U.S. Cl. .............................. 60/527; 60/528; 310/306
(58) Field of Search ...................... 60/527, 528, 529; 310/306, 307, 309

(56) References Cited

U.S. PATENT DOCUMENTS

| | | | | |
|---|---|---|---|---|
| 6,044,646 | A | * 4/2000 | Silverbrook | 60/528 |
| 6,324,748 | B1 | * 12/2001 | Dhuler et al. | 310/307 |
| 6,327,855 | B1 | * 12/2001 | Hill et al. | 60/528 |
| 6,367,251 | B1 | 4/2002 | Wood | |

OTHER PUBLICATIONS

U.S. patent application Ser. No. 60/312,706, Sarker et al, filed Aug. 16, 2001.

U.S. patent application Ser. No. 09/932,489, Ellis et al., filed Aug. 17, 2001.

Tuantranont, et al. "Smart Phase–Only Micromirror Array Fabricated by Standard CMOS Process," IEEE 0–7803–5273–4/00, pp. 455–460, 2000.

Hornbeck, et al., "Digital Micromirror Device™—Commercialization of a Massively Parallel MEMS Technology," American Society of Mechanical Engineers, DSC–vol. 62, pp. 3–8., 1997.

Toshiyoshi, et al., "Electrostatic Micro Torsion Mirrors for an Optical Switch Matrix," IEEE J. Microelectromechanical Systems, vol. 5, No. 4, pp. 231–237, Dec. 1996.

Motamedi, et al., "Micro–opto–mechanical Devices and On–Chip Optical Processing," Opt. Eng. vol. 38, No. 5, pp. 1282–1297, May 1997.

Judy, et al., "Magnetically Actuated, Addressable Microstructures," IEEE J. Microelectromedhcanical Systems, vol. 6, No. 3, pp. 249–256, Sep. 1997.

Pannu, et al., "Closed–Loop Feedback–Control System for Improved Tracking in Magnetically Actuated Micromirrors," IEEE 0–7803–8/00, pp. 107–108, 2000.

Que, et al., "Bent–Beam Electrothermal Actuators—Part I: Single Beam and Cascaded Devices," IEEE J. Microelectromechanical Systems, vol. 10, No. 2, pp. 247–254, Jun. 2001.

\* cited by examiner

*Primary Examiner*—Sheldon J. Richter
(74) *Attorney, Agent, or Firm*—Haynes and Boone, LLP

(57) ABSTRACT

Linear bimorph actuators are cascaded together in serpentine array structures to achieve large angle rotary displacements. Bimorph units contain single material beams that remain straight when heated coupled with substantially parallel bilayer beams that deflect when heated, due to differential thermal expansion of the layers. For a bilayer beam, advantageous materials are gold on top of polysilicon. The angular deflection is amplified by cascading to achieve cumulative rotational displacements up to greater than 90 degrees. Successive beams can be connected electrically in series to provide a continuous current path for resistive joule heating. In various embodiments, the actuator is fully permanently anchored or releasably attached to a substrate, or at least a segment of the substrate is removed from beneath the actuator to prevent mechanical interference. Embodiments enable single and plural-axis rotational displacement and manipulation of payloads, for example microcomponents, mirrors, and pick-and-place devices.

55 Claims, 4 Drawing Sheets

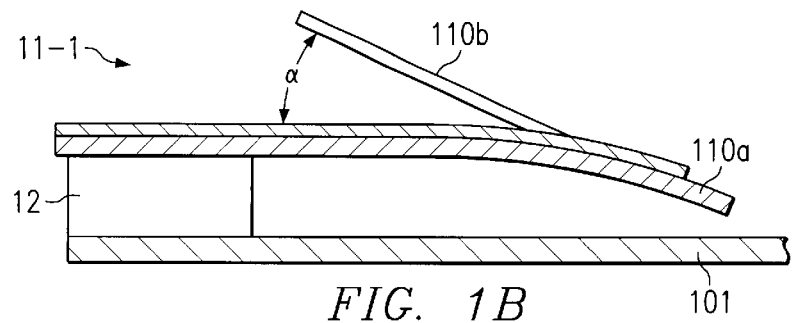
FIG. 1B
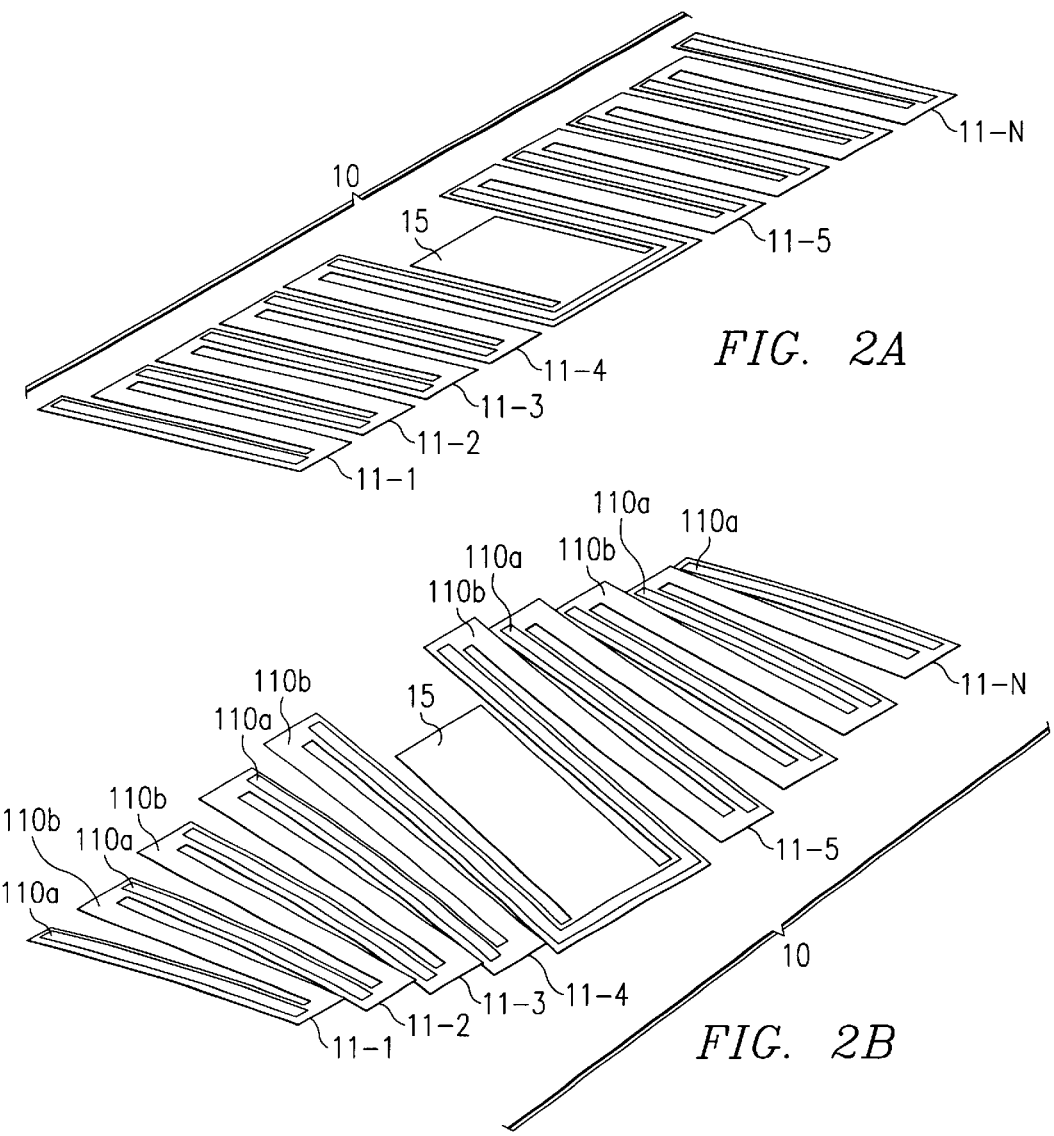
FIG. 2A
FIG. 2B

CASCADED BIMORPH ROTARY ACTUATOR

CROSS-REFERENCE TO RELATED APPLICATIONS

This application claims priority benefit of U.S. Provisional Patent Application No. 60/312,706 entitled "MICROCOMPONENTS AND APPLICATION THEREOF," filed Aug. 16, 2001, the disclosure of which is hereby incorporated herein by reference. This application is further related to co-pending and commonly assigned U.S. patent application Ser. No. 09/932,489 entitled "SYSTEM AND METHOD FOR PRECISE POSITIONING OF MICROCOMPONENTS," filed Aug. 17, 2001, the disclosure of which are hereby incorporated herein by reference.

TECHNICAL FIELD OF THE INVENTION

The present invention relates to micro-actuator devices, and more particularly to a system and method for multi-axis controlled rotation of micro-scale payloads using cascaded electrothermal microactuators.

BACKGROUND OF THE INVENTION

Using two materials to create an actuator has been known for decades. A bimetal strip, for example, will change its geometry with an increase in temperature due to a difference in thermal expansion coefficients.

Thermal actuators made of a single material have been described in the prior art. One bimorph embodiment, known as a Heatuator, is based on preferential expansion of one beam, which gets hotter than the other due to its smaller geometric cross-sectional area. These actuators require substantial energy to deflect, whereas other bimorph embodiments, which depend on the difference of properties between two dissimilar material layers and not on a preferential heating scheme, operate at lower temperatures with lower currents. For example, Tuantranont, et al., "Smart Phase-Only Micromirror Array Fabricated By Standard CMOS Process," IEEE 0-7803-5273-4/00 (2000) pp. 455–460 describes a piston micro-mirror incorporating four bimorphs in a standard CMOS foundry process providing a metalization layer, which is usually used only to conduct signals, on top of an oxide layer or a polysilicon layer involved in the process. Generally, bimorph configurations include a beam which has two different material layers and achieves end deflection relatively small compared to the length of the beam. Resistive joule heating is used to actuate the device. When current passes through it, it heats and deflects slightly. One problem is a limited range of motion. Another problem is difficulty obtaining rotary motion about an axis.

Prior art rotary devices incorporate multiple actuators that, for instance, engage a released circular plate and step it in small rotary increments. For example, Sarkar, et al., "Actuator Design for Variable Capacitors and Optical MEMS" presented at the Canadian Workshop on MEMS/Micromachining: Applying MEMS Research in Canada, Ottawa, Ontario (Aug. 17, 2001), hereby incorporated herein by reference, describes the use of Heatuators to grip and rotate a circular gear in a stepped fashion.

One method of scanning an optical beam requires mechanical rotation of a reflective surface. For example, Hornbeck, et al., "Digital Micromirror Device™—Commercialization of a Massively Parallel MEMS Technology," American Society of Mechanical Engineers, (DSC-Vol. 62, 1997), pp. 3–8, describes a tilting mirror supported and actuated by an electrostatically-driven torsion bar. The angle about which the mirror can rotate is limited in this approach to approximately 15 degrees. A related micromechanism is described in Toshiyoshi, et al., "Electrostatic Micro Torsion Mirrors for an Optical Switch Matrix," IEEE J. Microelectromechanical Systems, Vol. 5, No. 4 (Dec. 1996), pp. 231–237.

Motamedi, et al., "Micro-opto-mechanical Devices and On Chip Optical Processing," Opt. Eng. Vol. 38, No. 5 (May 1997), pp. 1282–1297, describes a micro optical bench on which mirrors on a micron scale are hinged to a substrate and rotated up to 90 degrees (i.e., perpendicular to the substrate), using bent beam or scratch drive actuators. These devices have also been designed to allow the mirror to return parallel to the substrate, thereby creating a rotational mirror device. It has also been demonstrated that several such mirrors can be configured on the substrate to create an optical switch by timing the flip up action.

Magnetically actuated self erecting structures have been described generally in the prior art. For example, Judy, et al., "Magnetically Actuated, Addressable Microstructures," IEEE J. Microelectromechanical Systems, Vol. 6, No. 3 (Sep. 1997), pp. 249–256, describes using a large magnetic field on the outside to activate micro devices made, for instance, of permalloy material. When the external magnetic field is applied, the magnetic material aligns itself in a new orientation, which is dependent on the field geometry. Pannu, et al., "Closed-Loop Feedback-Control System for Improved Tracking in Magnetically Actuated Micromirrors," IEEE 0-7803-8/00 (2000), pp. 107–108, describes controller embodiments that improve dynamic response and positioning precision of magnetically actuated micromirrors.

The prior art teaches multiple ways of cascading actuators to amplify motion. For instance, bent beam actuators produce small deflection in one direction if they are anchored on both sides. Que, et al., "Bent-Beam Electrothermal Actuators—Part I: Single Beam and Cascaded Devices," IEEE J. Microelectromechanical Systems, Vol. 10, No. 2, (Jun. 2001), pp. 247–254, describes cascading of bent beams by aligning two bent beam actuators at a selected angle relative to a third bent beam actuator. Small deflections at the tips of the two outside actuators push on the base of the third actuator to further amplify the motion at the tip of the third actuator, thereby creating a slightly larger deflection.

It would be desirable in the art to have some mechanism using bimorphs to generate large angle rotary motion as opposed to just linear motion, through actuation of linear tip displacements.

BRIEF SUMMARY OF THE INVENTION

The present invention is directed to a system and method which cascade linear bimorph actuators to achieve large angle rotary displacements. Bimorph units contain substantially parallel pairs of beams, including a single material beam that remains straight when heated and a bilayer beam that deflects when heated, due to differential thermal expansion of the layers. In some embodiments, this concept is applied as part of a unit cell. For a bilayer beam, advantageous materials are gold on top of polysilicon. As the bilayer beam is heated, the metal expands more than the polysilicon, producing a deflection at the end of this beam. The angular deflection is amplified by mechanically cascading interconnected unit cells in a serpentine fashion. In some embodiments, successive beams are connected electrically in series to provide a continuous current path for resistive joule heating of the beams. This configuration achieves cumulative rotational displacements up to greater than 90 degrees. In some embodiments, the actuator is fully released and removed from the substrate to prevent mechanical interference against the substrate when actuated. In other embodiments, at least a segment of the substrate is removed from beneath the actuator to prevent interference. In further embodiments, the actuator is permanently anchored to the substrate.

In some embodiments, instead of having the axis of rotation intersecting part of the actuator, where on actuation it could interfere with the substrate, resulting in failure to rotate, the actuator can instead rotate away from the plane of the substrate about some virtual axis of rotation away from the actuator.

Embodiments of the present invention include single and plural-axis rotary motion with anchored and releasable geometries. Potential applications include rotary tweezers; zero insertion force (ZIF) connectors with large contact surface areas; micro-mirror scanning, active optical alignment and beam steering, e.g., for telecom; large angle optical scanners; endoscopy and micro-surgery; MEMS manipulators; and any application in microsystems which requires large angle rotation about an axis.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 1B is a schematic side view along section 1B—1B parallel to the substrate of FIG. 1A, showing a typical unit cell;

FIGS. 2A–2B represent isometrically the serpentine structure of FIG. 1A respectively without and with deflection;

DETAILED DESCRIPTION

Figure 1A:
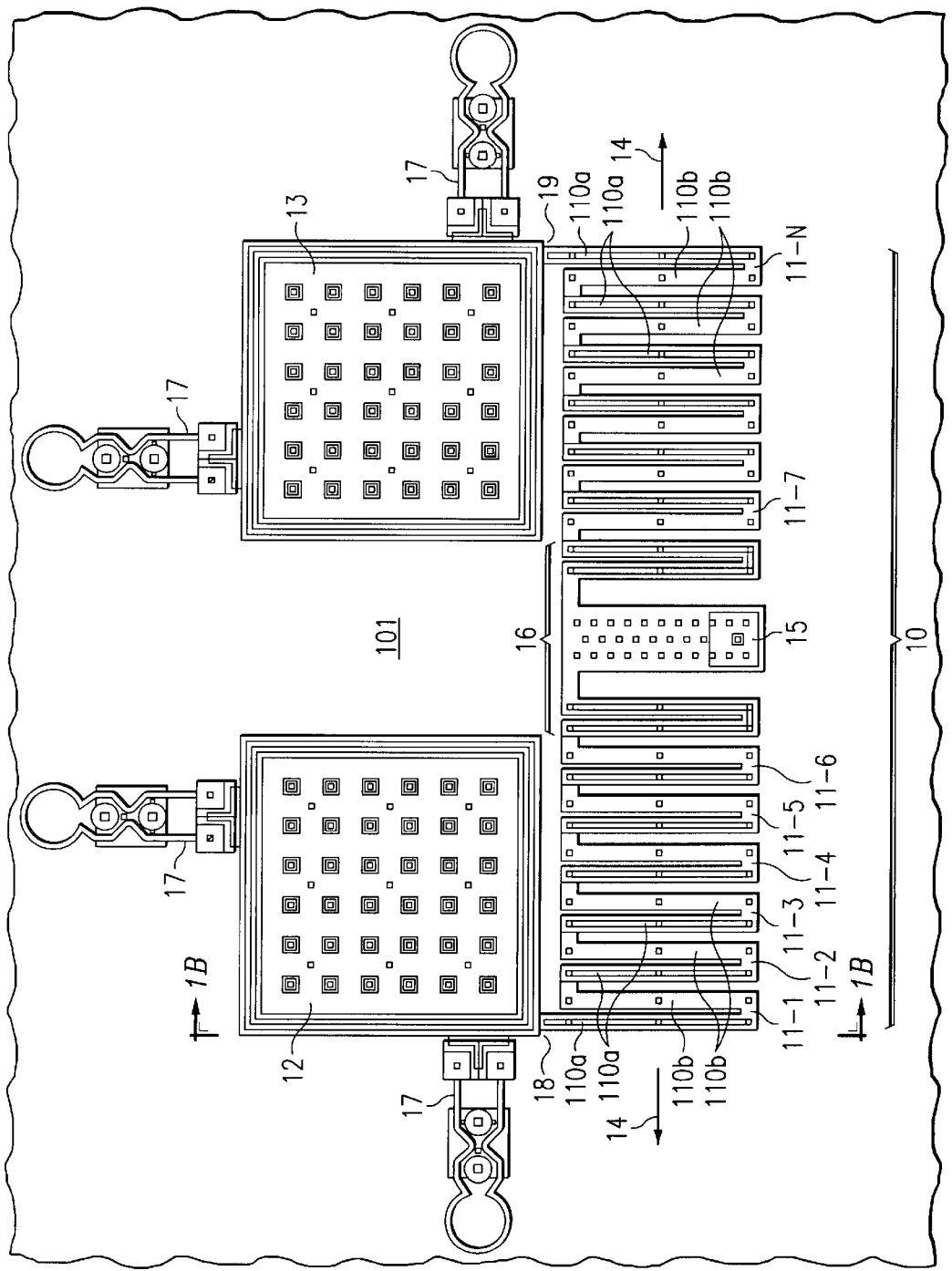
FIG. 1A is a plan view of a cascaded bimorph rotary actuator, according to an embodiment of the present invention.

FIG. 1A is a plan view of a cascaded bimorph rotary actuator, according to an embodiment of the present invention. A unit cell 11-1 contains two coupled beams, 110a and 110b. Beam 110a is for example a bilayer beam incorporating a gold layer on top of a polysilicon layer, whereas beam 110b is for example simply a straight beam of monolithic polysilicon. Multiple different dissimilar materials can be used instead of polysilicon and gold for bilayer beam 110a, provided that the layers have different thermal expansion coefficients. Beams 110a and 110b are connected together electrically in series and mechanically in a rigid folded configuration, as depicted in FIG. 1A. Unit cell 11-1 can be interconnected electrically in series with additional unit cells 11-2 through 11-N to form a serpentine structure 10 of bilayer beams, similar to beam 110a, alternating with monolithic beams, similar to beam 110b. Although unit cells 11-1 through 11-6 are illustrated in the left portion of FIG. 1A, the actual number of unit cells can be chosen at the will of the designer, depending on a desired application. One end of serpentine structure 10 is connected electrically and anchored mechanically to contact pad 12 at tip 18, and the other end of serpentine structure 10 is connected electrically and anchored mechanically to contact pad 13 at tip 19. Contact pads 12 and 13 are connected releasably by tethers 17 to substrate 101.

When an electric current passes through the series combination of beam 110a and beam 110b in unit cells 11-1 through 11-N, both beam 110a and beam 110b are heated and thermally expand, but the gold layer on beam 110a expands more than the polysilicon layer, causing beam 110a to deflect downward under thermal stress into the plane of the drawing, because the gold layer is on the top. Beam 110b, which is single material polysilicon, remains substantially thermally unstressed and straight regardless of temperature. In other words, unit cells 11-1 through 11-N are connected in series, such that deflected beam 110a is followed by straight beam 110b, which is attached to the beginning of next deflected beam 110a in the next unit cell.

FIG. 1B is a schematic side view along section 1B-1B parallel to substrate 101 of FIG. 1A, showing a typical unit cell 11-1 undergoing deflection in accordance with embodiments of the present invention. Because bilayer beam 110a and single material beam 110b are coupled together within unit cell 11-1 as depicted in FIG. 1B, and because folded serpentine structure 10 (not shown in FIG. 1B) is anchored at pads 12 and 13, the non-actuated initial position of first unit cell 11-1 is flat and parallel with substrate 101.

As unit cell 11-1 is heated, beam 110a deflects downward, because the gold layer on top expands thermally more than the polysilicon layer on the bottom and because beam 110a is anchored at contact pad 12. Since bilayer beam 110a is anchored at contact pad 12, the upper end of bilayer beam 110a forms an initial angle of zero degrees relative to the plane of contact pad 12. The lower end of bilayer beam 110a is deflected by differential thermal expansion to form a deflection angle $\alpha$ relative to the plane of contact pad 12. The lower end of bilayer beam 110a is rigidly connected to the lower end of single material beam 110b, which consequently also forms the same initial deflection angle $\alpha$ relative to the plane of contact pad 12 as does the lower end of bilayer beam 110a. However, single material beam 110b remains straight and continues above beam 110a in a plane that is rotated at the same deflection angle $\alpha$ relative to the plane of contact pad 12. Deflection angle $\alpha$ is repeated at each successive unit cell, producing a steadily increasing rotational displacement.

Referring again to FIG. 1A, progressing from outer tips 18 and 19 toward the center of folded serpentine structure 10, each successive unit cell 11-2 through 11-N rotates through deflection angle α and about axis 14, which passes through the midpoint of single material beam 110b for each unit cell 11-1 through 11-N. This in turn can rotate a payload, for example mirror 15, located substantially at the center lengthwise of serpentine structure 10. In some configurations mirror 15 for example will rotate about axis 14 and will simply scan an optical beam. In some embodiments, beams in central portion 16 of serpentine structure 10 are not unit cell beams, but are simply passive beams, which produce no net deflection, because they are adjacent gold-on-polysilicon beams that are connected back to back on either side of payload 15. They are accordingly not part of the rotation generating structure but rather part of the structure that is being rotated. Rotation axis 14 in FIG. 1A is shown above substrate 101. However, tethers 17 in the illustrated embodiment can be removed from substrate 101 by sliding, thereby releasing contact pads 12, 13 and thus the entire actuator from substrate 101. Under these circumstances, rotation axis 14 retains its position relative to serpentine structure 10 and is no longer fixed relative to substrate 101.

FIGS. 2A–2B isometrically represent serpentine structure 10 of FIG. 1A respectively with and without deflection. Each unit cell 11-1 through 11-N contains first bilayer beam 110a, having for example gold layered over polysilicon, and second single material beam 110b. All single material beams 110b remain straight, whereas all bilayer beams 110a are deflected because of differential thermal expansion. In the middle of serpentine structure 10 is payload location 15, where for example a rotating mirror can be mounted. The entire non-active central region 16 is progressively rotated by unit cells 11-1 through 11-N.

As the number of unit cells 11-1 through 11-N increases, the cumulative rotational displacement increases monotonically, since the incremental rotation angle of each successive unit cell adds to the combined rotation angle of the preceding unit cells. Cumulative rotational displacement also varies with the length of each beam. The active area of bimorph material determines the incremental deflection that is added by each unit cell. If six beams are heated to the same temperature and combined into one long beam, the tip of the combined beam would deflect the same amount as the sum of the deflections of the individual beams. However, by interconnecting the individual beams in serpentine structure 10 as illustrated in FIGS. 1A–2B, instead of deflection at the end of a long single beam, large angle rotation is achieved by adding the incremental deflections of the individual beams.

Additionally, as the number of unit cells increases, the rotational stiffness of serpentine structure 10 decreases, such that the resonant frequency of the device is lowered as a result of the softening of the spring elasticity. Accordingly, the structure can provide high frequency resonance combined with small displacement if the number of beams is small, and low frequency resonance combined with greater displacements if the number of beams is large.

As an example, if in FIG. 1A the lengths of beams 110a, 110b are on the order of 100 microns, and contact pads 12, 13 are about 200×200 microns in size, then the structure will resonate at about 1.5 kilohertz. If the total device rotation is 90 degrees in middle section 16 and there are six unit cells on each side, then each of the six unit cells is incrementally deflected through an angle of approximately 90 degrees divided by 6, or 15 degrees.

The illustrated current conduction path electrically connects tip 18 at one end of unit cell 11-1 through pad 12 and electrically connects tip 19 at the far end of unit cell 11-N through another pad 13. An electrical potential is applied between pads 12 and 13, causing a current to flow through all unit cells 11-1 through 11-N connected in series. Consequently, every unit cell carries substantially the same current because of the series conduction path, heating all unit cells substantially uniformly. Small nonuniformities in temperature distribution can arise, for example, because temperature at the center of a beam tends to be higher than at the walls due to conductive and/or convective cooling, and because of differences in electrical conductivities of dissimilar materials in bilayer beams 110a. An isothermal approximation is a practical and convenient approach.

In the present embodiment, the current path is disposed symmetrically on either side of the central payload location 15. In other embodiments, the current path can be entirely on one side, or having one end coming in from one side performing one angle of rotation and one end coming in from another side performing another angle of rotation. With electrical resistance joule heating, it is important to provide a current return circuit, and a symmetric path is a convenient configuration.

Alternative ways of thermally cycling this device include, for example, oven heating, laser irradiation, or heating by thermal conduction from an independently heated object. Any method of heating will produce substantially the same beam deflections and rotational displacements at the same temperature.

A wide variety of different payloads can be carried in payload region 15, which is simply the part of the actuator being rotated, in other words the stage. For example a scanning mirror could contain aluminum, silver, and/or other reflective material. A pick-and-place device, for example rotary tweezers, could be made of a different sort of material.

Figure 3:
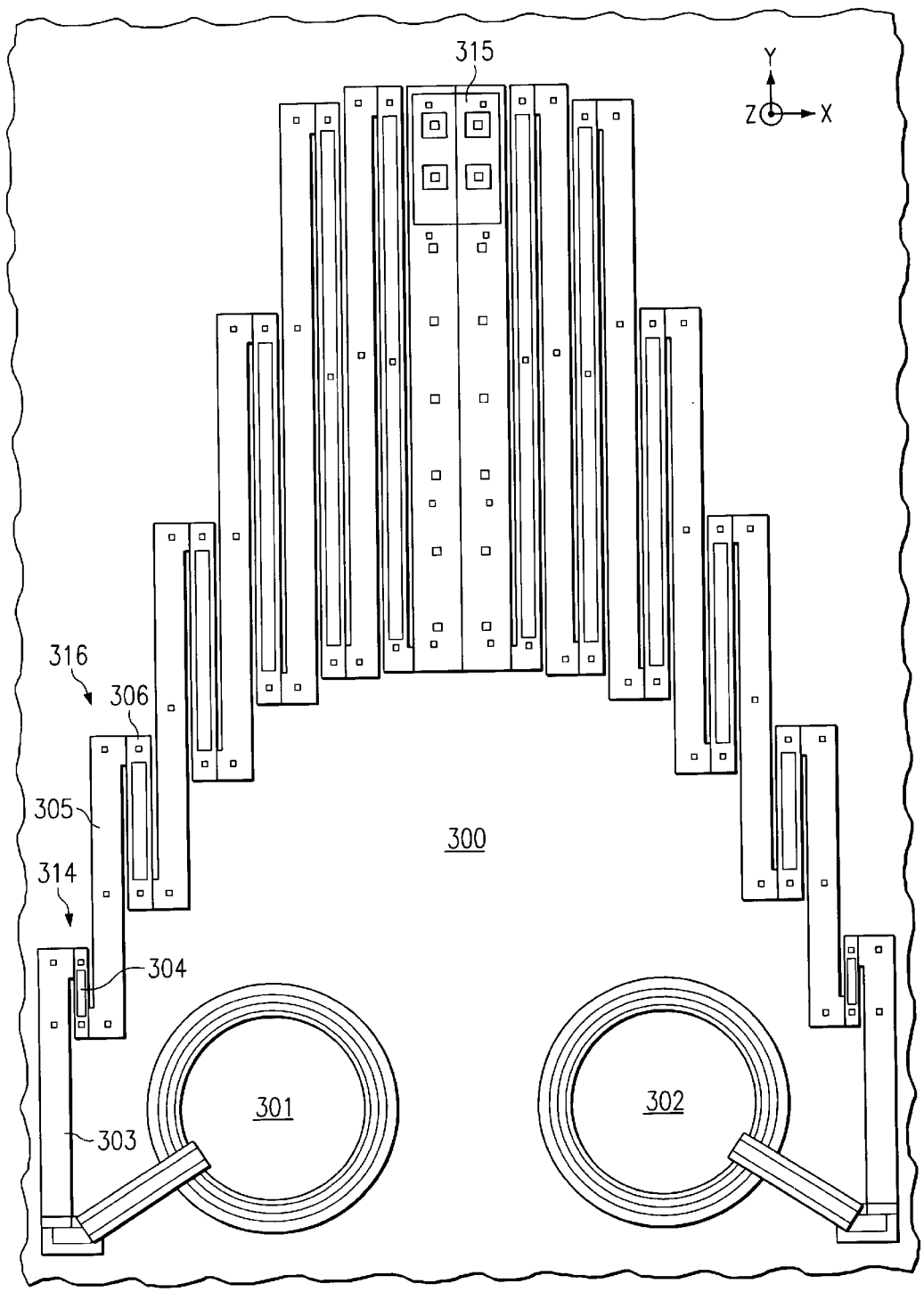
FIG. 3 is a plan view depicting an alternative embodiment of the present invention, using substantially the same unit cell concept as in FIGS. 1A–2.

FIG. 3 is a plan view depicting an alternative embodiment of the present invention, using substantially the same unit cell concept as in FIGS. 1A–2B. For clarity, coordinate axes X, Y, and Z are shown, with the positive Z axis pointing out of the plane of the figure. Substrate 300 lies substantially parallel to the XY plane. The structure in FIG. 3 is configured symmetrically in the X direction about a YZ mirror plane midway between electrical contact pads 301 and 302. Therefore all elements described in the left portion of FIG. 3 have mirrored counterpart elements with similar descriptions in the right portion of FIG. 3.

In operation, electric current is applied between contact pads 301 and 302 to heat the structure. Single material beam 303, similar to beam 110b in FIG. 1A, remains straight (e.g., parallel with substrate 300). Bilayer beam 304, having a gold layer on top similar to beam 110a in FIG. 1A, is rigidly connected with single material beam 303 at their adjacent ends, and bends down toward substrate 300 due to differential thermal expansion. To prevent mechanically interfering with substrate 300, bilayer beam 304 is made shorter than single material beam 303. Connected with the far end of bilayer beam 304 is longer single material beam 305, which remains straight and is angled up and away from substrate 300. Connected with the far end of single material beam 305 is bilayer beam 306, that will again bend down, but can be longer than bilayer beam 304, because it is farther above substrate 300. Each successive single material beam angles more steeply away from substrate 300, consequently adding rotational displacement about an axis parallel to the X axis, but away from substrate 300 in the XY plane, applying the principles described in connection with FIGS. 1A–2B.

Unit cells 11-1 through ll-N in FIG. 1A are accordingly replaced in FIG. 3 by bimorph units such as bimorph unit 316 containing coupled beam pair 305 and 306 and bimorph unit 314 containing coupled beam pair 303 and 304, such that successive bimorph units each contain alternating bilayer beams and single material beams, which are typically staggered in length and position. Payload region 315, analogous with payload region 15 of FIG. 1A, is located adjacent to the bimorph units farthest from contact pads 301, 302.

The structure of FIG. 3 is anchored to substrate 300 at contact pads 301, 302 and can accordingly self erect off of the substrate. Alternatively, the structure of FIG. 3 can be flexibly tethered either fully releasably or non-releasably to the substrate. A releasable design would typically have a relatively simpler actuation motion than that described in connection with FIG. 3, for example an actuation motion similar to the embodiments described in connection with FIGS. 1A–2B.

Figure 4:
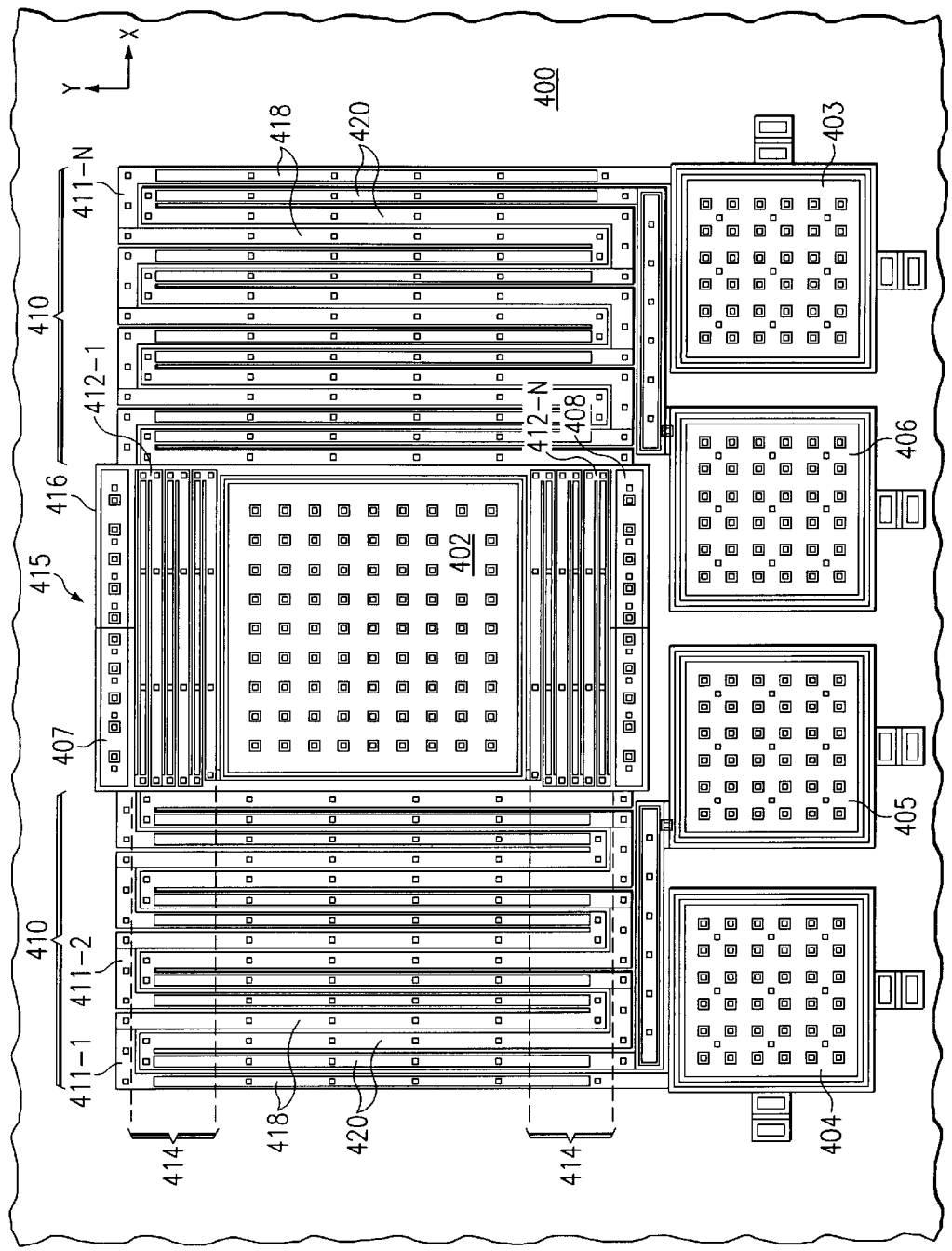
FIG. 4 is a schematic top view depicting a two-axis embodiment in accordance with the present invention.

FIG. 4 is a schematic top view depicting a two-axis rotational embodiment in accordance with the present invention. For clarity, coordinate axes X and Y are drawn parallel to the plane of substrate 400, and the Z axis (not shown) is taken to be out of the paper perpendicular to the plane of substrate 400. Four contact pads 403–406 are tethered to the substrate. Unit cells 411-1 through 411-N each containing paired bilayer and single material beams aligned parallel with the Y axis are interconnected sequentially with one another through symmetric serpentine structure 410 similar to serpentine structure 10 of FIG. 1A and are coupled with X-axis rotatable mount 416 similar to central region 16 of FIG. 1A. Rotatable mount 416 carries unit cells 412-1 through 412-N each containing paired bilayer and single material beams aligned parallel with the X axis, interconnected with one another through serpentine structure 414, and coupled with Y axis rotatable stage 402 similar to payload region 15 of FIG. 1A. Applying principles described above in connection with FIGS. 1A–2B, mount 416 is rotatable about an axis parallel with the X-axis and stage 402 is rotatable about an axis parallel with the Y-axis. These rotations when combined can rotate a payload attached to stage 402 about an axis parallel with substantially any combination of X and Y axes.

Rotatable mount 416 carries a subsystem 415 very similar to the total system depicted in FIG. 1A. Likewise, rotatable stage 402 in subsystem 415 is analogous to payload region 15 of FIG. 1A. In the implementation depicted in FIG. 4, two sets of unit cells are interwoven with one another, such that two current loops 418 and 420 are individually interconnected with four contact pads 403–406.

In operation, for example, applying balanced differential +/–5 volt potential between outer contact pads 403 and 404 results in current running in current loop 418 through unit cells 411-1 through 411-N connected in series between outer contact pads 403 and 404. Because of the balanced potential, there will be zero voltage at midpoint pad 407 of current loop 418 located at the upper edge of rotatable mount 416.

Applying balanced +/–5 volt potential between inner contact pads 405 and 406 results in current running through current loop 420 interwoven with current loop 418. Current loop 420 likewise follows a serpentine path through serpentine structure 410, such that it imposes minimal mechanical constraint to the rotation of the serpentine structure. To maintain electrical isolation, current loops 418 and 420 are interwoven onto separate beams, as shown in FIG. 4. Alternatively, current loops 418 and 420 can be implemented as separate electrically conductive traces deposited for example on different polysilicon surfaces in unit cells 411-1 through 411-N. Current through both current loops 418 and 420 together cooperatively heats unit cells 411-1 through 411-N. This actuates bimorph beams in unit cells 411-1 through 411-N, causing rotatable mount 416 to rotate about the X-axis. Because of the balanced potential between inner contact pads 405 and 406, there will be zero voltage at midpoint pad 408 of current loop 420 on rotatable mount 416. Current midpoint pads 407 and 408 are interconnected with one another through serpentine structure 414 of subsystem 415 containing unit cells 412-1 through 412-N. However, if the voltages are zero at both midpoint pads 407 and 408 due to balanced potentials across both inner and outer sets of contact pads 403–404 and 405–406 respectively, then no current actuates unit cells 412-1 through 412-N coupled to rotatable stage 402.

Alternatively, if the potentials are offset such that, for example, plus 5 volts is applied to inner contact pad 405 and minus 1 volt is applied to inner contact pad 406, then the voltage at midpoint pad 408 will be half of the potential difference, i.e., plus 2 volts. Now a current will run through unit cells 412-1 through 412-N because of the potential difference of plus 2 volts between midpoint pads 407 and 408. This actuates bimorph beams in unit cells 412-1 through 412-N, causing rotatable stage 402 to rotate about the Y-axis. Accordingly, by independently varying the voltages applied to four contact pads 403–406 and thereby varying the currents through serpentine structures 410 and 414, two-axis rotation of a payload at rotatable stage 402 can be accurately achieved.

Under certain operating conditions, there may be an imbalance in the currents running through the various unit cells, which will cause nonuniform heating. In addition there can be incidental heating and thermal crosstalk due to thermal conduction between the unit cells and subsystems. It is recognized that these nonuniformities can be corrected through known techniques such as calibration, biasing, or compensation. Additionally, various known design techniques can be applied to minimize thermal conductivity between the cascaded unit cells and subsystems.

Herein has been described a class of thermal rotary actuators based on a unit cell containing paired bimorph and straight beams. When the unit cells are cascaded, the tip deflections are summed, describing a helix-like rotary displacement. Embodiments provide single and plural-axis motion using anchored and releasable geometries. Applications include rotary tweezers; ZIF connectors with large contact surface areas; active optical alignment and beam steering, e.g., for telecom; large angle optical scanners; endoscopy and micro-surgery; MEMS manipulators; and any application in microsystems which requires large angle rotation about an axis. Related co-pending and commonly assigned U.S. patent application Ser. No. 09/932,489, the disclosure of which has been incorporated herein by reference, describes techniques for plastically deforming electrothermal micro-actuator structures, enabling applications such as precise linear and angular positioning of microcomponents.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A rotary actuator comprising:
    a plurality of cascaded coupled beams having lengths aligned approximately parallel with one another, staggered in longitudinal position and disposed in at least one substantially planar folded serpentine array structure such that adjacent beams in said serpentine array structure are rigidly joined together at an end of said beam that alternates with each successive beam and such that the initial and the final beam of said serpentine array structure each have a terminal end not joined together with an adjacent beam, said plurality of beams comprising:
    at least two first beams operable when activated to deflect in a first direction in a plane substantially perpendicular with said substantially planar folded serpentine array structure and substantially parallel with said lengths of said beams; and
    at least one second beam operable when activated to remain undeflected,
    said folded serpentine array structure operable when activated to rotate said final terminal end relative to said initial terminal end through an angle of rotation substantially proportional to the sum of the deflections of all of said first beams in said folded serpentine array structure.

2. The rotary actuator of claim 1 wherein said angle of rotation is greater than ninety degrees.

3. The rotary actuator of claim 1 wherein said angle of rotation occurs about an axis selected from the group consisting of a physical axis intersecting a portion of said actuator and a virtual axis outside said actuator.

4. The rotary actuator of claim 1 wherein said initial terminal end is attached to a substrate using a technique selected from the group consisting of permanent anchoring and flexible tethering.

5. The rotary actuator of claim 1 wherein said initial terminal end is releasably fastened to a substrate.

6. The rotary actuator of claim 1 wherein at least a portion of a substrate adjacent said actuator is removed.

7. The rotary actuator of claim 1 further operable to erect said rotary actuator off of a substrate.

8. The rotary actuator of claim 1 wherein said lengths of said beams are substantially uniform.

9. The rotary actuator of claim 1 wherein said beams are staggered in length.

10. The rotary actuator of claim 1 wherein said beams are approximately 100 microns in length.

11. The rotary actuator of claim 1 wherein said second beam is a single material beam.

12. The rotary actuator of claim 1 wherein said first and said second beams alternate with one another in said at least one said serpentine array structure.

13. The rotary actuator of claim 1 wherein said beams in said serpentine array structure are connected electrically in series with one another.

14. The rotary actuator of claim 1 wherein said beams are operable to be thermally activated.

15. The rotary actuator of claim 14 wherein said beams are operable to be thermally activated using a method selected from the group consisting of oven heating, laser heating, conductive heating, and resistive joule heating.

16. The rotary actuator of claim 1 wherein said first beam is a bilayer beam having two dissimilar material layers.

17. The rotary actuator of claim 16 wherein said first beam is operable to be deflected using differential thermal expansion of said two dissimilar material layers.

18. The rotary actuator of claim 16 wherein said two dissimilar materials are gold and polysilicon.

19. The rotary actuator of claim 1 wherein said final terminal end is coupled to a payload region operable to rotate a payload.

20. The rotary actuator of claim 19 wherein said payload is selected from the group consisting of microcomponents, mirrors, and pick-and-place devices.

21. The rotary actuator of claim 19 comprising at least two said serpentine array structures configured such that a second said serpentine array structure is coupled to said payload region of a first said serpentine array structure.

22. The rotary actuator of claim 21 wherein said beams in said first and said second said serpentine array structures are electrothermally activated by electric current in two interwoven current paths.

23. The rotary actuator of claim 22 wherein said electrical currents in said respective first and said second said serpentine array structures are independently variable.

24. A method of rotary actuation of an actuator comprising the steps of:
    coupling a plurality of beams together in at least one substantially planar folded serpentine array structure such that adjacent beams in said serpentine array structure are substantially parallel in length to one another, are staggered in longitudinal position and are rigidly joined together at an end of said beam that alternates with each successive beam and such that the initial and final beams of said serpentine array structure each have a terminal end not joined together with an adjacent beam, said plurality of beams comprising at least two first beams and at least one second beam; and
    activating said beams such that said first beams deflect in a first direction in a plane substantially perpendicular with said substantially planar folded serpentine array structure and substantially parallel with said lengths of said beams and such that said second beams remain undeflected, such that said final terminal end is rotated relative to said initial terminal end through an angle of rotation substantially proportional to the sum of the deflections of all of said first beams in said folded serpentine array structure.

25. The method of claim 24 wherein said angle of rotation is greater than ninety degrees.

26. The method of claim 24 wherein said angle of rotation occurs about an axis selected from the group consisting of a physical axis intersecting a portion of said actuator and a virtual axis outside said actuator.

27. The method of claim 24 wherein said initial terminal end is attached to a substrate.

28. The method of claim 24 wherein said initial terminal end is releasable from a substrate.

29. The method of claim 24 wherein said actuator self erects off of a substrate.

30. The method of claim 24 wherein said first and said second beams alternate with one another in said at least one said serpentine array structure.

31. The method of claim 24 wherein said beams in said serpentine array structure carry electric current in series with one another.

32. The method of claim 24 wherein said beams are thermally activated.

33. The method of claim 32 wherein said beams are thermally activated by a method selected from the group consisting of oven heating, laser heating, conductive heating, and resistive joule heating.

34. The method of claim 32 wherein said thermal activation causes differential thermal expansion in said first beams.

35. The method of claim 24 further comprising the step of rotating a payload region attached to said final terminal end.

36. The method of claim 35 further comprising coupling a second said serpentine array structure to said payload region of a first said serpentine array structure.

37. The method of claim 36 wherein said first and said second serpentine array structures are each independently activated such that each of said first and said second serpentine array structures causes rotation about a different axis of rotation.

38. The method of claim 37 wherein said first and said second serpentine array structures are electrothermally activated by electric current in two interwoven current paths.

39. A system for producing rotary motion comprising:

a plurality of cascaded coupled beams having lengths aligned approximately parallel with one another, staggered in longitudinal position and disposed in at least one substantially planar folded serpentine array structure such that adjacent beams in said serpentine array structure are rigidly joined together at an end of said beam that alternates with each successive beam and such that the initial and the final beam of said serpentine array structure each have a terminal end not joined together with an adjacent beam, said plurality of beams comprising:

at least two first beams operable when activated to deflect in a first direction in a plane substantially perpendicular with said substantially planar folded serpentine array structure and substantially parallel with said lengths of said beams; and at least one second beam operable when activated to remain undeflected, said folded serpentine array structure operable when activated to rotate said final terminal end relative to said initial terminal end through an angle of rotation substantially proportional to the sum of the deflections of all of said first beams in said folded serpentine array structure.

40. The system of claim 39 wherein said angle of rotation is greater than ninety degrees.

41. The system of claim 39 wherein said initial terminal end is attached to a substrate.

42. The system of claim 39 wherein said initial terminal end is releasably fastened to a substrate.

43. The system of claim 39 further operable to erect said rotary actuator off of a substrate.

44. The system of claim 39 wherein said beams are staggered in length.

45. The system of claim 39 wherein said second beam is a single material beam.

46. The system of claim 39 wherein said first and said second beams alternate with one another in said at least one said serpentine array structure.

47. The system of claim 39 wherein said beams in said serpentine array structure are connected electrically in series with one another.

48. The system of claim 39 wherein said beams are operable to be thermally activated.

49. The system of claim 48 wherein said first beam is a bilayer beam having two dissimilar material layers, such that said first beam is operable to be deflected using differential thermal expansion of said two dissimilar material layers.

50. The system of claim 39 wherein said final terminal end is coupled to a payload region operable to carry a payload.

51. The system of claim 50 comprising a second said serpentine array structure coupled to said payload region of a first said serpentine array structure.

52. The system of claim 51 operable to produce rotary motion about a combination of rotational axes.

53. The system of claim 51 wherein said beams in said first and said second said serpentine array structures are electrothermally activated by electric current in two interwoven current paths.

54. The system of claim 53 wherein said electrical currents in said respective first and said second said serpentine array structures are independently variable.

55. The system of claim 39 further comprising components selected from the group consisting of rotary tweezers, mirrors, optical alignment means, beam steering means, optical scanning means, micro-surgical means, and MEMS manipulation means.

* * * * *